Patented July 29, 1924.

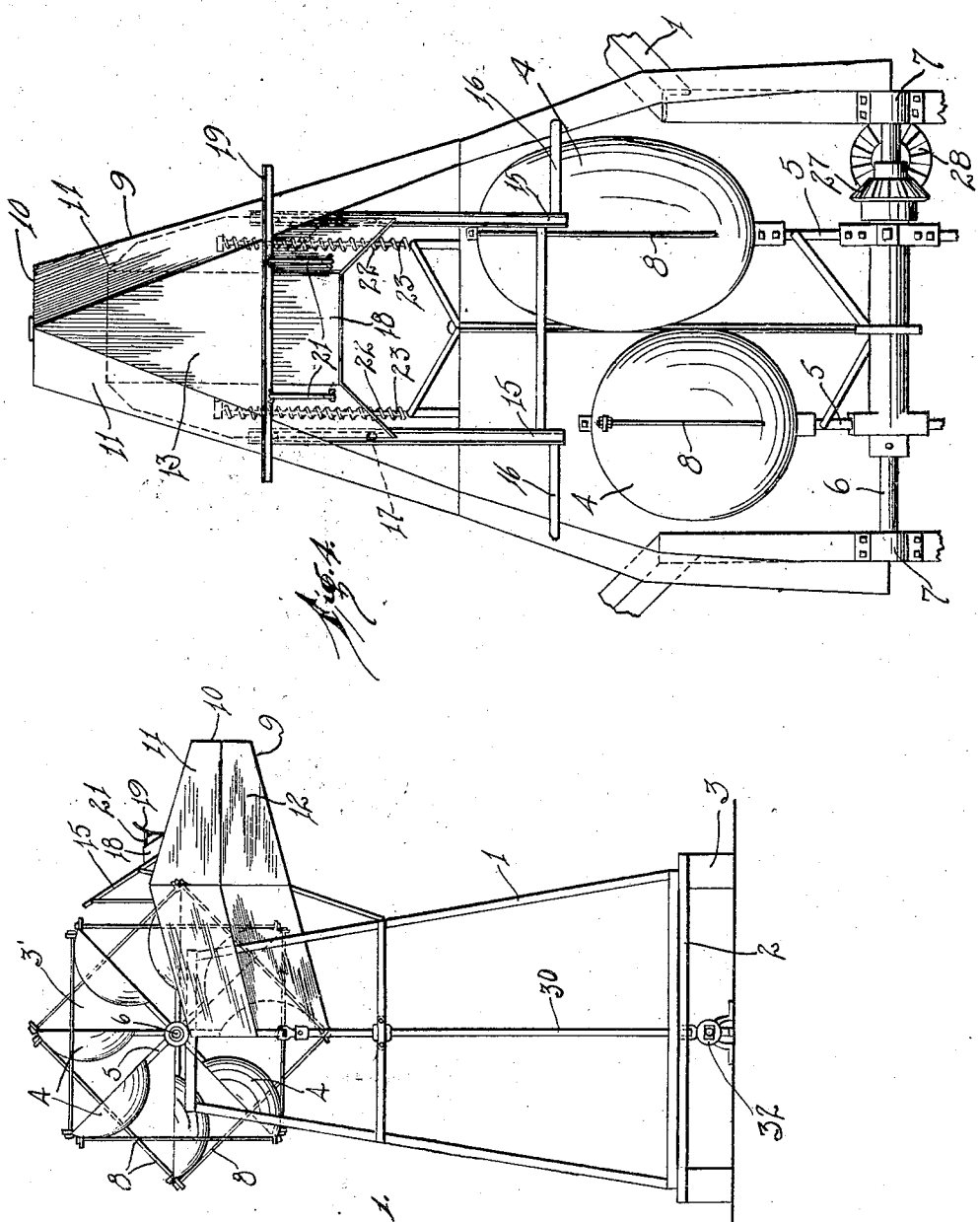

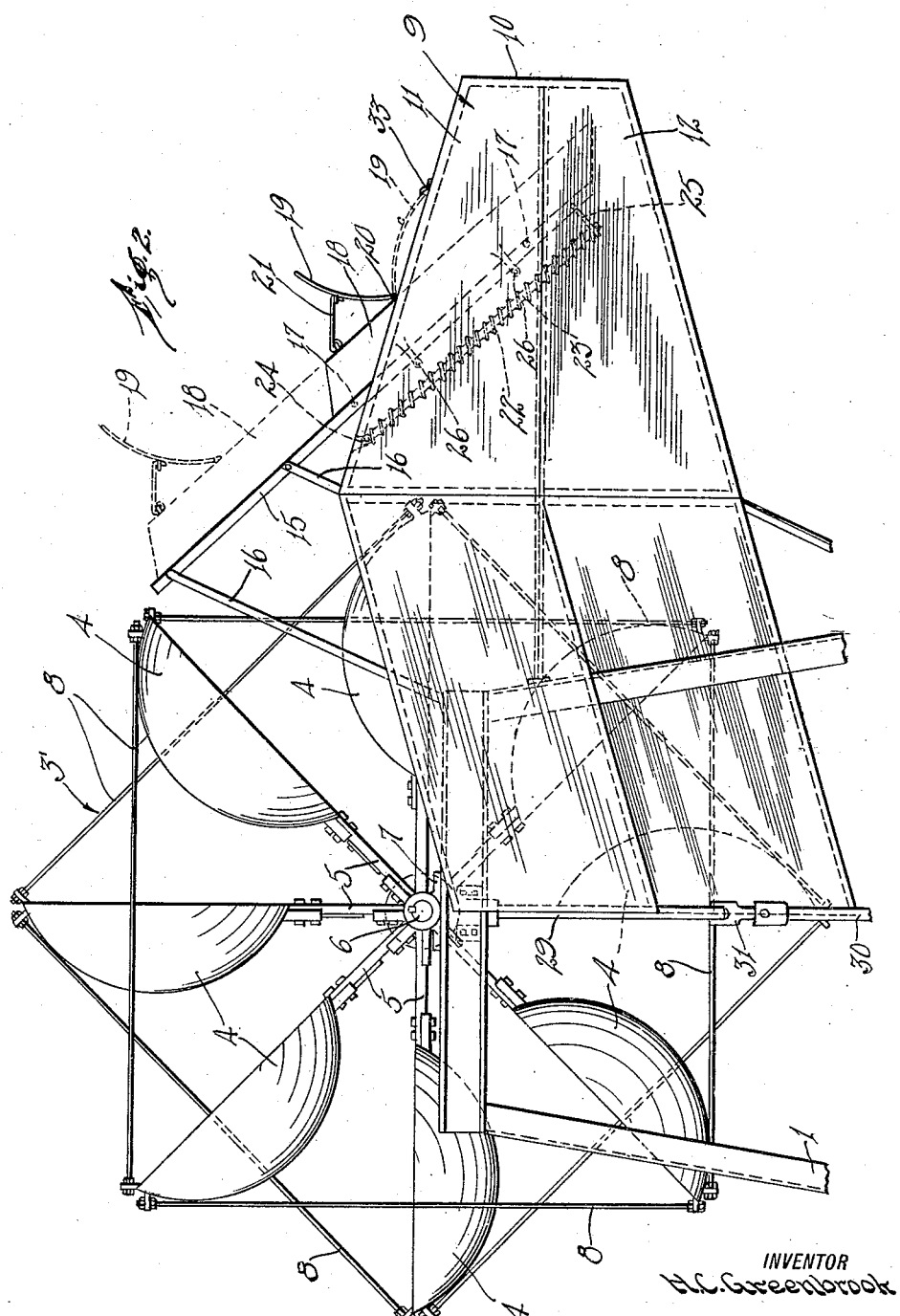

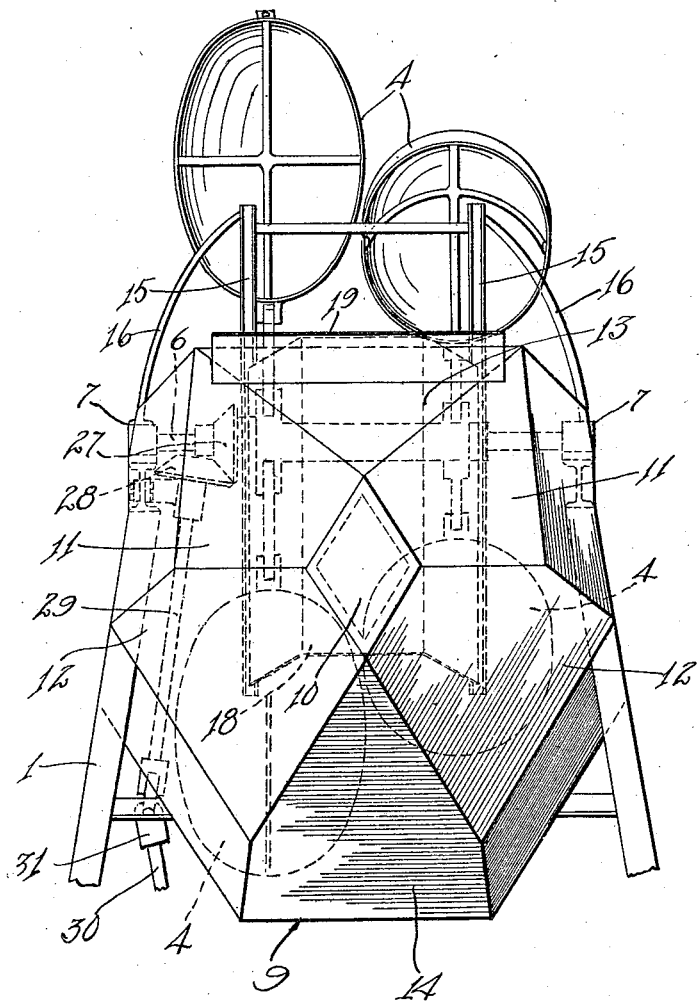

1,502,950

UNITED STATES PATENT OFFICE.

HANS C. GREENBROOK, OF CHICAGO, ILLINOIS.

WIND MOTOR.

Application filed February 5, 1923. Serial No. 617,032.

*To all whom it may concern:*

Be it known that I, HANS C. GREENBROOK, a subject of the King of Denmark, and a resident of Chicago, in the county of Cook and State of Illinois, have invented a new and useful Improvement in Wind Motors, of which the following is a full, clear, and exact description.

My invention relates to improvements in wind motors, and it consists in the combinations, constructions, and arrangements herein described and claimed.

An object of my invention is to provide a wind motor which has novel means for cutting off the wind to the portion of the wind wheel that is moving against the wind.

A further object of my invention is to provide a device of the type described which has means for swinging the wind wheel so as to permit the wind wheel to be turned in the direction of the wind flow.

A further object of my invention is to provide a device of the type described which has novel means for keeping the speed of the wind wheel constant no matter at what velocity the wind is moving.

A further object of my invention is to provide a device of the type described which is simple in construction, durable and efficient for the purpose intended, and which is not likely to easily get out of order.

Other objects and advantages will appear in the following specification, and the novel features of the invention will be particularly pointed out in the appended claims.

My invention is illustrated in the accompanying drawings forming part of this application, in which—

Figure 1 is a side elevation of the device,

Figure 2 is an enlarged side elevation of the wind wheel and wind shield,

Figure 3 is a front elevation of Figure 2, and

Figure 4 is a top plan view of the device.

In carrying out my invention I provide a frame, indicated generally at 1, which is mounted upon a turn table 2, whereby the frame may be swung into any position desired so as to align the wind wheel 3 with the direction of the flow of wind. The turn table in turn is mounted upon a supporting base 3.

The upper end of the frame 1 carries the wind wheel 3 (see Figure 2). The wheel 3 consists of two series of cup-shaped members 4 which are carried by arms 5 that project radially from a common shaft 6. The shaft 6 is mounted in bearings 7 which are disposed upon the frame 1. It will be noted that the cup-shaped members 4 are secured to each other by tie-rods 8. In the present form of the device I have shown four of these cup-shaped members as being mounted upon a single hub. Two of these hubs are mounted upon the shaft 6. The cup-shaped members 4 that are secured to one of the hubs are staggered with respect to the cup-shaped members 4 that are secured to the other hub. In this manner the wheel 3 is provided with eight cup-shaped members, which are equally spaced from each other about the periphery of the wheel.

The device is designed so that the concave side of the members 4 face the wind shield 9 when they are disposed at the top of the wheel 3. The wind shield 9 is fashioned so as to enclose the lower portion of the wheel 3, whereby the wind will not strike the cups 4 that are disposed at the bottom of the wheel 3. The front of the shield 9 has a blunt nose 10 which causes the air striking the shield to flow along the sides 11 and 12 of the shield. The shape of the nose 10 is clearly shown in Figure 3, and it will be noted that the sides 11 and 12 taper outwardly from the nose so as to protect the lower portion of the wind wheel 3. The shield 9 is also provided with a top wall 13 and a bottom wall 14. The walls 11 to 14 inclusive are tapered so as to form a stream line effect to the wind shield 9. This shield is adapted to prevent the wind from striking the lower portion of the wind wheel and at the same time to so direct the course of the wind from the lower portion of the wind wheel that there will be no eddy currents or vacuum pockets about the wind wheel.

It is obvious that with the foregoing construction, the wind wheel 3 would rotate at various speeds, which would be determined by the speed of the air as it flows by the device. The wind shield 9 is provided with a novel construction for keeping the rotation of the wind wheel 3 constant, no matter how often the speed of the air varies. As clearly shown in Figure 2, the wind shield 9 carries two guide channels 15. These channels are supported by braces 16 and are inclined in the manner shown. The channels are U-shaped in cross section, and receive rollers 17, which in turn support an auxiliary wind shield 18. The shield 18 carries a curved plate 19 which is hinged to the shield 18 at 20. The plate 19 is held in vertical position by means of a hook 21 that is carried by the auxiliary shield 18.

The shield 18 is yieldingly held in its lowermost position by a compression spring 22. The spring 22 is mounted upon a guide rod 23, the rod in turn being connected to the wind shield 9 at 24, and being slidably disposed in an arm 25 that is carried by the shield 18. The shield 18 is also provided with guide rollers 26 which prevent the removal of the shield 18 from the channels 15.

From the foregoing description of the various parts of the device, the operation thereof may be readily understood. In operation, the frame 1 is rotated so as to point the nose in the direction in which the wind is flowing. The wind will strike the cup-shaped members 4 which are not covered by the shield 9 and will rotate the wind wheel 3. The shaft 6 of the wind wheel is provided with a beveled gear 17 which is in mesh with a beveled gear 28 that is mounted upon a stub shaft 29. In the present form of the device, the shaft 29 is inclined slightly from vertical so as to clear the cup-shaped members 4. The shaft 29 is connected to a shaft 30 by means of a universal joint 31, (see Figure 3). The shaft 30 is operatively connected to a drive shaft 32, (see Figure 1). The shaft 32 is adapted to be connected to any device, not shown, so as to actuate the device.

In case the device is driving a heavy load, it is not necessary to use the wind shield 18. In order to place the wind shield in inoperative position, it is merely necessary to swing the plate 19 from the full line position shown in Figure 2 into the dotted line position. The operator often desires to have the wind wheel 3 rotated at a constant speed. The plate 19 and the shield 18 are adapted to automatically regulate the amount of air which strikes the members 4 so as to keep the wheel 3 rotating at a constant speed. The plate 19 is held in vertical position by means of the hook 21 when it is desired to use a shield 18 as an automatic control. When the velocity of the wind increases beyond a predetermined speed, it will cause the plate 19 to move upwardly and to carry with it the shield 18. As clearly shown in Figures 3 and 4, this shield is wide enough to prevent the air from striking the members 4. It is obvious that as the speed of the wind increases, the spring 22 will be compressed to a greater extent. The shield 18 is adapted to move from the full line position shown in Figure 2 into the dotted line position. As soon as the velocity of the wind decreases, the spring 22 will start to move the shield 18 back into its lowermost position. It will therefore be observed that during the entire operation of the device, the shield 18 will be moved up and down along the guide channels 15 so as to regulate the amount of air which strikes the wind wheel 3, whereby the speed of the wind wheel is kept constant.

The plate 19 may be secured in its inoperative position by means of a hook 33, (see Figure 2). The device is relatively simple in construction, and provides a novel, efficient, and durable means for providing a wind mill which is adapted to maintain a constant speed no matter at what velocity the wind is moving.

It will be apparent from the construction of the blades described that I have provided in my improved wind motor, blades which are substantially cup-shaped and therefore capable of effectively receiving the impact of wind blown at points divergent from the axis of the cup-shaped blade. This is a most important advantage, since in the use of the ordinary flat blade, the effectiveness of the impact of the wind against the blade is greatly diminished where the wind strikes the blade at an angle and not directly upon the blade.

I claim:

1. A device of the type described comprising a frame, a wind wheel carried by said frame, a wind shield adapted to cover the portion of said wind wheel that is turned against the wind, an auxiliary wind shield movably carried by said first named shield, a curved plate secured to said auxiliary shield, said curved plate being adapted to raise said auxiliary shield to cover a greater portion of the wind wheel when the wind exceeds a predetermined speed, said plate being hinged to said auxiliary shield, whereby it may be swung into inoperative position.

2. A wind motor comprising a frame, a wind wheel carried by said frame, a wind shield covering a portion of said wind wheel, an auxiliary shield carried by said first named shield, a curved plate carried by said auxiliary shield and adapted to be moved by the wind so as to raise said auxiliary shield to control the amount of air striking said wind wheel, and spring means for moving said auxiliary shield into neutral position.

3. A wind motor comprising a frame, a wind wheel carried by said frame, a wind shield covering a portion of said wind wheel, an auxiliary shield carried by said first named shield, a curved plate carried by said auxiliary shield and adapted to be moved by the wind so as to raise said auxiliary shield to control the amount of air striking said wind wheel, and springs for moving said auxiliary shield into neutral position.

4. A wind motor comprising a frame, a wind wheel having cup-shaped members carried by said frame, a wind shield covering a portion of said wind wheel, an auxiliary shield carried by said first named shield, a curved plate carried by said auxiliary shield and adapted to be moved by the wind so as to raise said auxiliary shield to control the amount of air striking said wind wheel, and spring means for moving said auxiliary shield into neutral position.

5. A wind motor comprising a frame, a wind wheel having cup-shaped members carried by said frame, a wind shield covering a portion of said wind wheel, an auxiliary shield carried by said first named shield, a curved plate carried by said auxiliary shield and adapted to be moved by the wind so as to raise said auxiliary shield to control the amount of air striking said wind wheel, and springs for moving said auxiliary shield into neutral position.

HANS C. GREENBROOK.